United States Patent [19]
Hartmann

[11] Patent Number: 5,803,543
[45] Date of Patent: Sep. 8, 1998

[54] CHILD'S SEAT FOR MOUNTING ON A STANDARD SEAT FOR ADULTS

[75] Inventor: Johannes Hartmann, Maintal, Germany

[73] Assignee: Ekkehard Grimm, Offenbach am Main, Germany

[21] Appl. No.: 857,189

[22] Filed: May 15, 1997

[30] Foreign Application Priority Data

May 17, 1996 [DE] Germany ............... 296 08 894 U
Oct. 26, 1996 [DE] Germany ............... 196 44 325.1

[51] Int. Cl.$^6$ ............................. A47C 1/02; B60N 2/26
[52] U.S. Cl. ............... 297/256; 297/250.1; 297/230.12
[58] Field of Search .............................. 297/254, 255, 297/256, 250.1, 230.1, 230.12, 230.14

[56] References Cited

U.S. PATENT DOCUMENTS

| | | | |
|---|---|---|---|
| 2,434,007 | 1/1948 | O'Dea | 297/230.14 |
| 2,658,556 | 11/1953 | Fleisher et al. | 297/256 |
| 2,992,854 | 7/1961 | Berlin | 297/256 |
| 3,237,985 | 3/1966 | Goldberg | 297/256 |
| 3,669,492 | 6/1972 | Peterson | 297/256 |
| 4,989,888 | 2/1991 | Qureshi et al. | 297/254 |
| 5,031,960 | 7/1991 | Day | 297/254 |

FOREIGN PATENT DOCUMENTS

| | | | |
|---|---|---|---|
| 1360567 | 3/1964 | France | 297/255 |
| 1937610 | 2/1971 | Germany | 297/254 |
| 2845983 | 4/1980 | Germany . | |

OTHER PUBLICATIONS

Derwent database record for DE 2845983 (1997).

*Primary Examiner*—Peter R. Brown
*Assistant Examiner*—Anthony D. Barfield
*Attorney, Agent, or Firm*—Felfe & Lynch

[57] ABSTRACT

A seating surface part and a backrest part are connected to each other in such a way that they can pivot around an axis and thus be folded together into a collapsed position. Retaining belts are provided for the seating surface part and to the backrest part, which has a spacer device on the outside surface facing away from the seating surface side. This spacer device projects out beyond the outside surface of the backrest part when the seat is in use. A retaining device which can be connected to an adult seating unit is provided on the backrest part.

11 Claims, 8 Drawing Sheets

CHILD'S SEAT FOR MOUNTING ON A STANDARD SEAT FOR ADULTS

BACKGROUND OF THE INVENTION

The present invention pertains to a child's seat for mounting on an adult seating unit, the child's seat being provided with a seating surface part and a backrest part, which are fastened so that they can pivot with respect to each other around an axis in such a way that they can be folded on top of each other and thus collapsed, the child's seat also being provided with a safety belt attached to the seating surface part and/or the backrest part.

A child's seat of this type is known from, for example, DE-A1-2,845,983. This seat is attached to an adult seat by means of belts. For transport, the backrest part can be folded down onto the seating surface, and the seat can thus be transported as a compact unit. In use, the backrest part is flipped up into an approximately right-angled relation to the seating surface part and possibly attached to the backrest of an adult seat. So that the height of the seating position can be adjusted for a child, a scissors joint is mounted on the bottom of the seating surface part. This joint can be used to raise or lower the seating surface.

In addition, child's seats are also known which either have only a seating surface part, which is fastened to the seating surface of an adult seat, or are designed in the form of seat shells, with a seating surface part and a backrest part, which are rigidly connected to each other or which are produced as single piece with the two parts at a certain angle to each other.

Conventional seats in vehicles are designed to accommodate adults of average size. When a child's seat is mounted on seats of this type, a problem point for the child sitting in the seat is that the edge of the seating surface of the adult seat projects out beyond the seating surface of the child's seat. This means that child's legs must rest on the edge of the adult seat and cannot hang freely down. The seating position therefore becomes uncomfortable for the child, especially during long trips. If, to make the seating position of the child more comfortable in this respect, the seating surface is raised by means of, for example, a scissors joint on the bottom of the seating surface of the child's seat, as described further above, it is necessary to raise the seating surface very high above the seating surface of the main seat to provide the required freedom of movement for the child's legs. As a result of this elevation, however, the seating position is very unfavorable to the child for safety reasons. Especially in airplanes, very strict requirements must be imposed on seats for children. Precisely in airplanes, an elevated position cannot be accepted from the viewpoint of safety.

SUMMARY OF THE INVENTION

The present invention provides a child's seat for motor vehicles which offers the child comfortable seating in spite of a low seat position, but which can be built compactly, so that when it is not in use, it can be easily stored. In addition, the child's seat is suitable for use in airplanes and is to meet the requirements relevant to this use.

According to the invention, the backrest part has a spacer device on the outer side facing away from the seating surface side. This device, when in use, projects beyond the outside of the backrest part, and a retaining device which can be fastened to an adult seat unit is provided on the backrest part. By means of the spacer device, the backrest part of the child's seat can be held a suitable distance away from the backrest of the adult seating unit to which the child's seat is attached. As a result of this spacer part, furthermore, the backrest part is well supported on the adult seat backrest. Because of this forward position of the backrest part, the forward edge of the seating surface part is brought so far forward that it is approximately flush with the forward edge of the seating surface of the main seating unit, and a child sitting in the child's seat can move its legs freely and let them hang freely down. Because in practice the seating surface part is not required to produce an elevated seating position for the child, the seating surface part of the child's seat can be relatively thin and therefore relatively light in weight. The same is also true for the backrest part, because the spacer device alone is able to provide sufficient separation between the child's seat and the backrest of the main seat. Because the backrest part is connected to the seating surface part by a joint, the two parts can be folded together when the seat is not in use and thus stowed away in a small space, which is especially advantageous in airplanes. By the same token, the spacer device is also attached to the backrest of the child's seat in such a way that it can be folded in. Thus, when the seat is not in use, the spacer device can be folded down onto the back of the backrest part. It can also be advantageous for the purpose of obtaining a thin design for recesses to be provided in the backrest part, in which the folding spacer device can rest when not in use.

So that the spacer elements can be narrow or thin but still provide sufficient support against the main seating unit, the spacer device is made up of at least two spacer elements, which are attached to the backrest part a certain distance away from each other, preferably to the two lateral edges of the backrest part. Furthermore, it can also be advantageous for weight reasons to design the two spacer elements in the form of bails in the shape of a "U". The two free ends can in this case be designed to function as joints, so that the U-shaped bails can be folded down.

It is necessary for the spacer device or the spacer elements which make up a spacer device such as this to be held securely in the extended position, backrest part, so that, when pressure is exerted on the backrest part, the spacer device or the spacer elements will remain in their extended position. For this purpose, the angles by which the spacer elements pivot out from the collapsed position are selected to be greater than 90°, which means there is no need to provide special latching devices, which would have to be actuated when the spacer elements are extended. In the extended position, these spacer elements can then rest on a contact surface, against which the extended spacer element is pressed when pressure is exerted on the backrest part.

So that the child's seat can be securely attached to the main seat of a vehicle, two belts are attached as retaining devices to the backrest part; these belts are then hooked to the backrest of the main seat, or, in the case of an independent backrest part as found in the individual seats used in, for example, tour buses and airplanes, passed around the seat backrest part, so that the two ends can be connected together and pulled tight. Precisely when a child's seat is not in use, such belts hang down annoyingly from the back rest part and under certain conditions can get hooked in storage spaces. Because such belts should be mounted permanently to the backrest part for safety reasons, a pocket is therefore provided on the backrest part, into which these belts, when not being used, can be stowed. This pocket is therefore easily accessible even after the child's seat has been collapsed, so that the belts are readily accessibly for attachment of the child's seat to the main seat.

Not only should the child's seat be attached to the main seat by its backrest part but it should also be attached to the seating surface of the adult seat upon which it is placed by its own seating surface. Such additional securing of the seating surface part is necessary when the child's seat is used in airplanes, so that the child's seat forms a structural unit with the main seat with respect to both the backrest part and also the seating surface part, which is important especially in emergencies. So that the seating surface part can be attached in this way, hook elements are provided on the bottom of the seating surface part; a safety belt of the adult seating unit, which belongs to the main seat on which the child's seat is placed, can then be engaged in these hook elements. These hook elements make it easy to attach the seating surface part especially when a lap belt on the main seat is present, as is the case in airplanes. This lap belt can be passed through the hooks and pulled tight. To facilitate this hooking operation, the hook elements are positioned with their openings facing toward the free, forward edge of the seating surface part. To give the seat sufficient strength with respect to the attachment points of the hook elements, these hook elements are provided on longitudinal rails extending in the lengthwise direction, and each of the hook elements can consist of a slot in the rail. The lap belt, for example, can then be easily inserted into such a slot. If the hook elements are situated near the joint, it is also possible for the retaining belts to be inserted into the slots after the backrest part has already been fastened to the main seat and while the seating surface part is still in the folded-up position, that is, flipped up against the backrest part, so that the hook elements or slots are freely accessible.

Especially when the child's seat is made of molded parts of a light-weight material, preferably polycarbonate or polyurethane foam, a reinforcing rail extending in the longitudinal direction of the backrest part is inserted into the backrest part; all of the forces which can act on the seat by way of, for example, the retaining belts, can be conducted into it. In addition, it is also possible, if desired, to attach the hinge points of the spacer device to this reinforcing rail as well. A reinforcing rail of this type also acts to absorb the forces coming from a headrest part, extending from the upper edge of the backrest part; this headrest part can be attached to the reinforcing rail in a sliding manner, if desired, so that the height of the headrest part and thus the length of the backrest part can be adjusted to fit the body size of the child sitting in the seat. If such a headrest part is provided, the ends of second safety belts are attached to this headrest part or are passed through this headrest part, so that the height of the attachment points of these safety belts are also shifted in correspondence with the adjustment of the headrest part.

DETAILED DESCRIPTION OF THE PREFERRED EMBODIMENT

A child's seat 1 according to the invention, as shown in the figures, has a seating surface part 2; a backrest part 3, which is connected to seating surface part 2 by a hinge-like joint 4, and a headrest 5, which extends from the top, transverse edge of backrest part 3. Child's seat 1 is, as FIGS. 1–4 show, mounted on a seating unit or a main seat 6 for adults. The main seat shown is a seat such as that which can be found in buses or airplanes. Such seats have a backrest part 7 separate from that of adjacent seat 6 (see FIG. 4) and a flat, fold-away tray 8 on the back of backrest part 7, this tray belonging to the seating position or seat behind the seat shown in the figures. It can be folded down for use into the position illustrated in FIG. 3.

Figure 4:
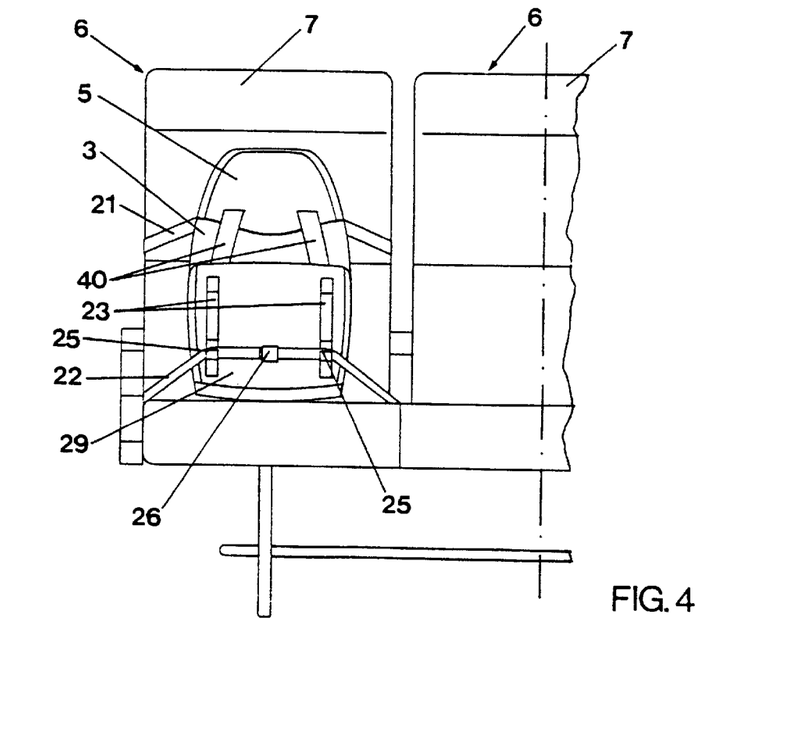
FIG. 4 is a front view of the seat of FIG. 3.
Figure 5:
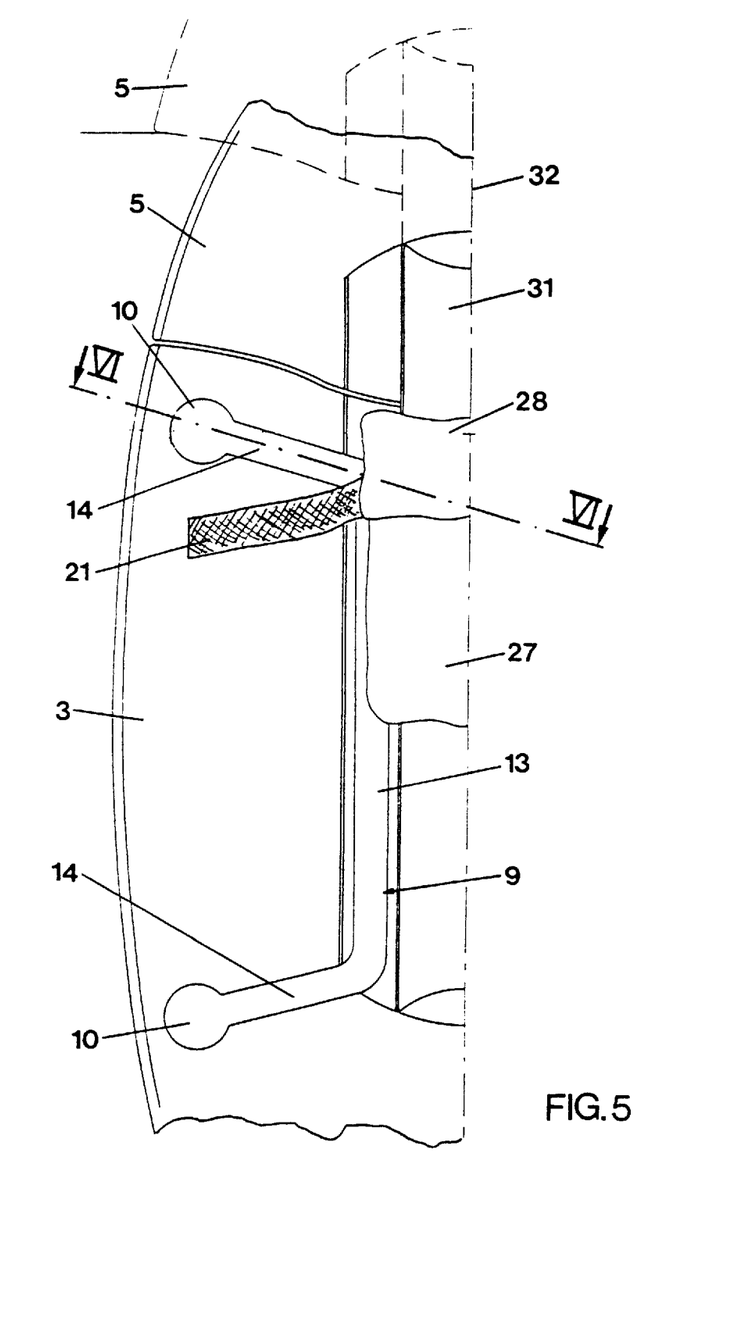
FIG. 5 is a rear view of the left half of the backrest part and of the headrest, the headrest also being indicated in a pulled-out position.
Figure 6:
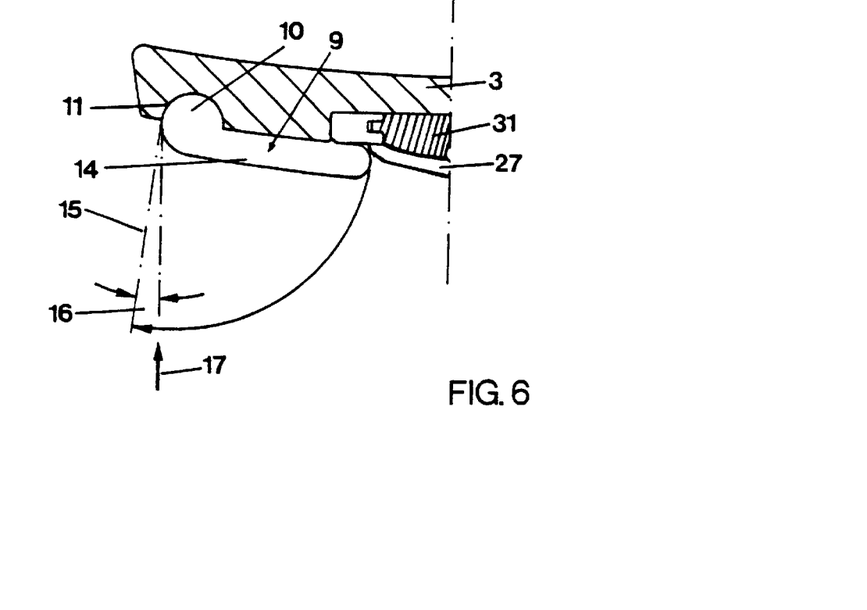
FIG. 6 is a cross section along line 6—6 of FIG. 5.

The child's seat shown has two U-shaped bails 9 on the back of backrest part 3. Each of these U-shaped bails 9 is provided at the ends of its free shanks with balls 10 guided in respective in sockets 11 to form ball joints, as can be clearly seen in the cross-sectional diagram of FIG. 6. The balls 10 are retained in sockets 11 by bosses which are provided with slots to permit pivoting the bail 9. The two joints 10 and bearing shells 11 are arranged near longitudinal edge 12 of backrest part 3, so that longitudinal bar 13 of U-shaped bail 9 is vertical or parallel to longitudinal edge 12 of backrest part 3. When child's seat 1 is not in use, U-shaped bail 9, held at joints 11, is pivoted in such a way that longitudinal rod 13 rests against the back of backrest part 3, as shown in FIGS. 5 and 6. To attach child's seat 1 in the design shown in FIGS. 1–4 to main seat 6, U-shaped bails 9 are folded out from the original position as shown in FIGS. 5 and 6 so that they are approximately perpendicular, projecting in the direction shown by dash-dot line 15 in FIG. 6. U-shaped bails 9 are, however, pivoted farther by a small angle, as shown in FIG. 6 by reference number 16, so that a pressure exerted in the direction of arrow 17 in FIG. 6 on longitudinal rod 13 of bail 9 holds the bail in the extended position.

Figure 1:
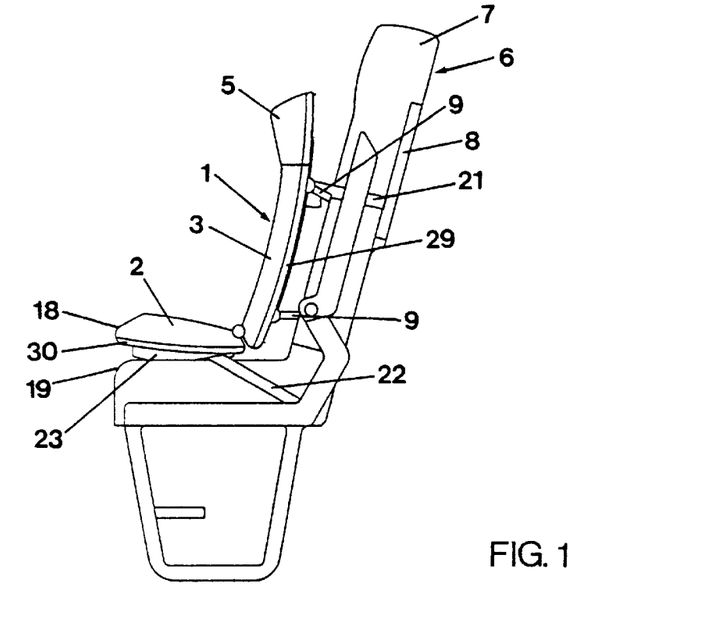
FIG. 1 is a side view of a seat for an adult of the type used in, for example, buses and airplanes, with a child's seat according to the invention mounted thereon, in the extended position.
Figure 2:
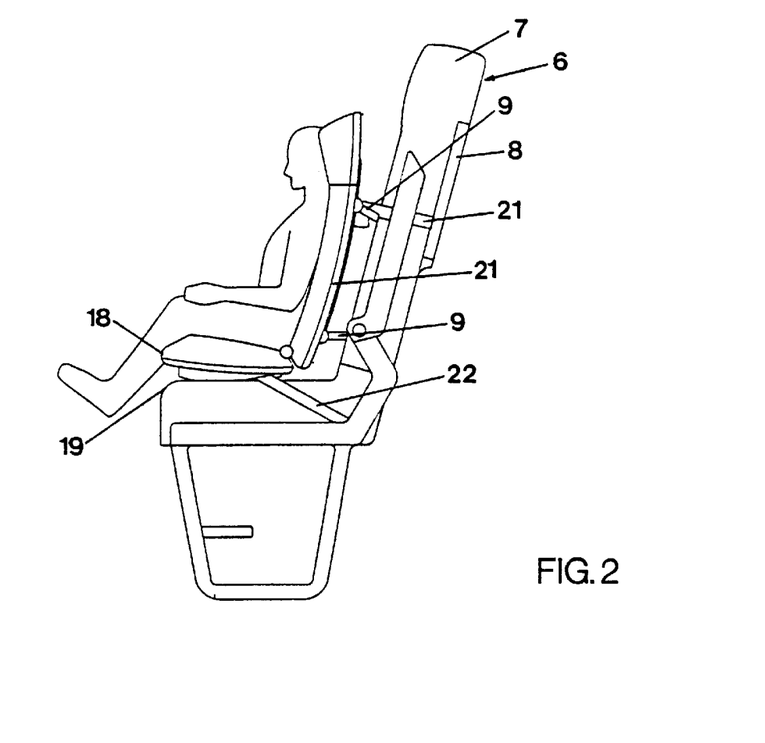
FIG. 2 is a side view of the seat arrangement of FIG. 1 with a child sitting on the child's seat.

As can be seen in FIGS. 1 and 2, backrest part 3 of the child's seat is kept a certain distance away from backrest part 7 of main seat 6 by these two U-shaped bails 9, which form spacer elements, with the result that forward edge 18 of seating surface part 2 of child's seat 1 is just above forward edge 19 of seating surface part 20 of main seat 6. As a result, the child sitting on child's seat 1 is given a seating position such that its legs, as shown in FIG. 2, can hang freely downward without being interfered with by forward edge 19 of main seat 6. At the same time, the child's seating position is kept low.

Figure 3:
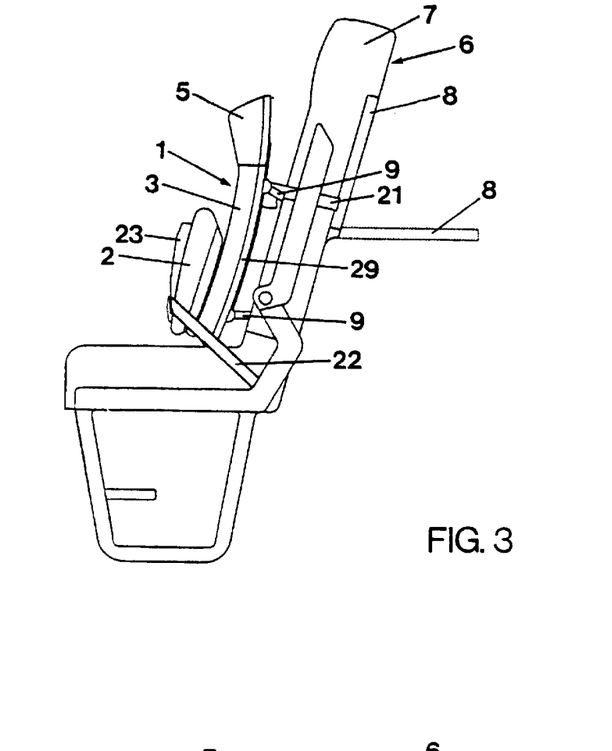
FIG. 3 is a side view of the seat illustrated in FIGS. 1 and 2 with the seating surface part folded up.

Child's seat 1 is fastened by two belts 21, which are attached to back rest part 3 in the area of upper joints 10 of bails 9, to backrest 7 of main seat 6. For this purpose, the two belts 21 are guided around backrest 7 of the main seat and connected together and tightened by means of a connecting element not shown in detail in such a way that bails 9 are pressed against the front surface of backrest 7. To fasten these belts 21 to backrest 7 in cases where main seat 6 has a tray 8, this tray is first folded down; belts 21 are fastened together; and then the tray is folded up again, so that tray 8 can continue to be used by the person sitting in the seat behind. Seating surface part 2 of child's seat 1 is also secured in place, for which purpose a lap belt 22, which is normally present on the type of main seat 6 found in buses and airplanes, is used. So that this can be done, two lengthwise rails 23 are provided on the bottom of seating surface part 2 of child's seat 1 or integrated into seating surface part 2, each of which has a hook element 24, which is formed by a slot 25, as shown by the embodiment of the seat illustrated in FIG. 7. After seating surface part 2 has been folded upward, as FIGS. 3 and 4 show, lap belt 22 is guided through these slots 25, connected by buckle 26, and pulled tight. Then seating surface part 2 can be folded back down again into the seating position, as shown in FIGS. 1 and 2. It has been found that seating surface part 2 can be pivoted more easily around hinge-like joint 4 when hook elements 24, that is, slots 25, in the illustrated embodiment, are located very close to the rear edge of seating surface part 2 (near the pivot axis of the seating surface part).

So that belts 21 belonging to backrest part 3, which are permanently attached to backrest part 3 and thus form a permanent component of child's seat 1, can be stowed away when child's seat 1 is not in use in such a way that they do not cause any hindrance, a pocket 27 is provided on the back of backrest part 3. The belts are stored in this pocket 27, which has a cover flap 28.

As can be seen in the side views of FIGS. 1–3, seating surface part 2 and backrest part 3 are made of rear and bottom shell elements or molded parts 29, 30, which are provided on the seating side with soft cushioning. These molded parts 29, 30 are preferably made of polycarbonate which is characterized by its high intrinsic strength and light weight.

Figure 8:
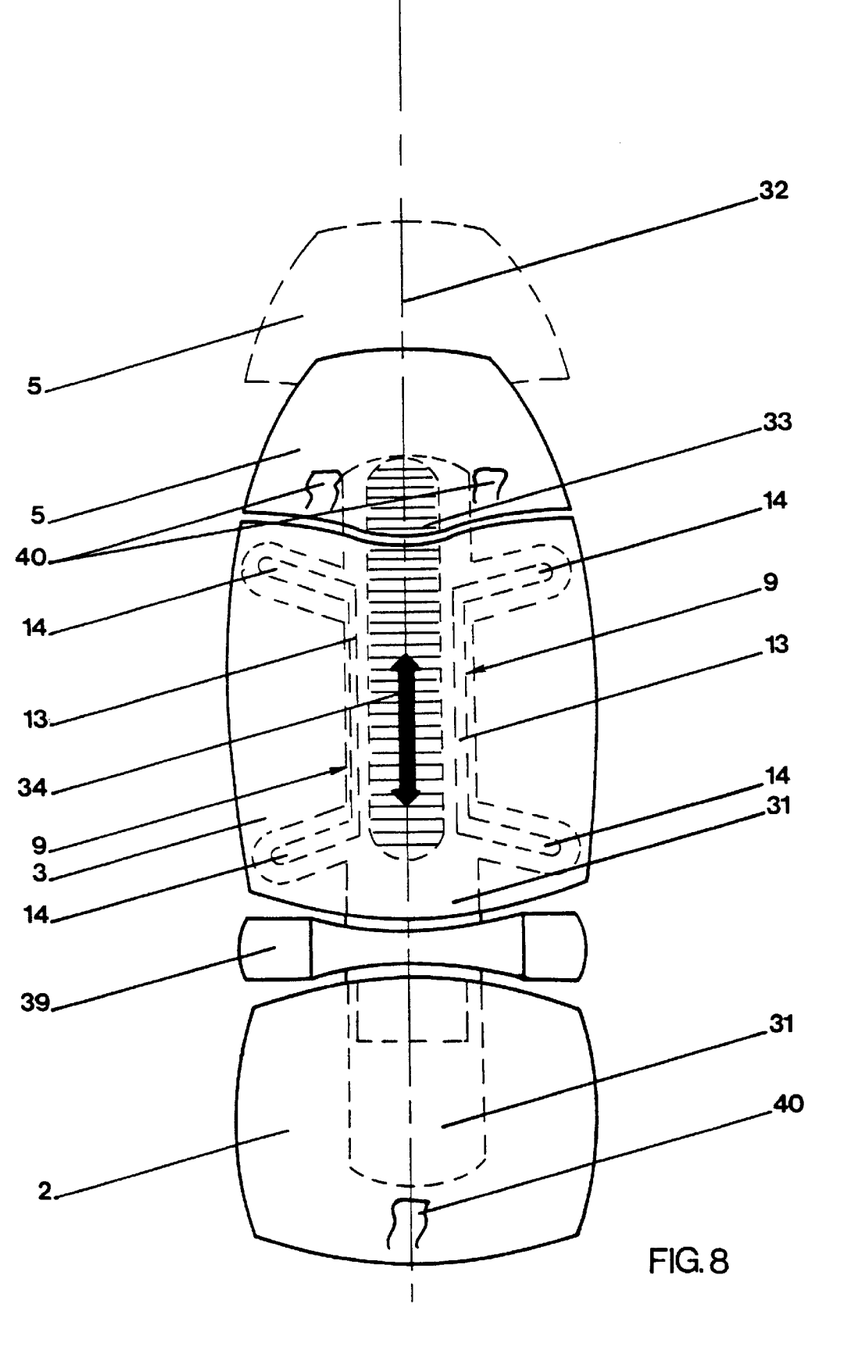
FIG. 8 shows a schematic diagram of a seat according to the invention for the purpose of explaining the individual elements of the seat.

If greater strength is required, especially in view of the fact that belts 21, U-shaped bails 9, and/or rails 23 must be anchored in child's seat 1, a reinforcing rail 31 can be provided in child's seat 1. Reinforcing rail 31 can be seen in the area of longitudinal axis 32 of seat 1 in FIG. 5. Reinforcing rail 31, such as a flat metal rail, continues into seating surface part 2 and into headrest 5. Referring FIG. 8, a bar 33 also passes through reinforcing rail 31, extending along longitudinal axis 32 of backrest part 3, so that headrest 5 can be adjusted by sliding bar 33 in the direction of double arrow 34 between a bottom position, in which headrest 5 forms an immediate extension of backrest part 3, and a fully extended position. In FIG. 8, this fully extended position is shown by the drawing of an additional headrest 5, which can be seen above the headrest in the lower position. In FIG. 5, this upper position is indicated by a headrest 5 drawn in broken line.

Figure 7:
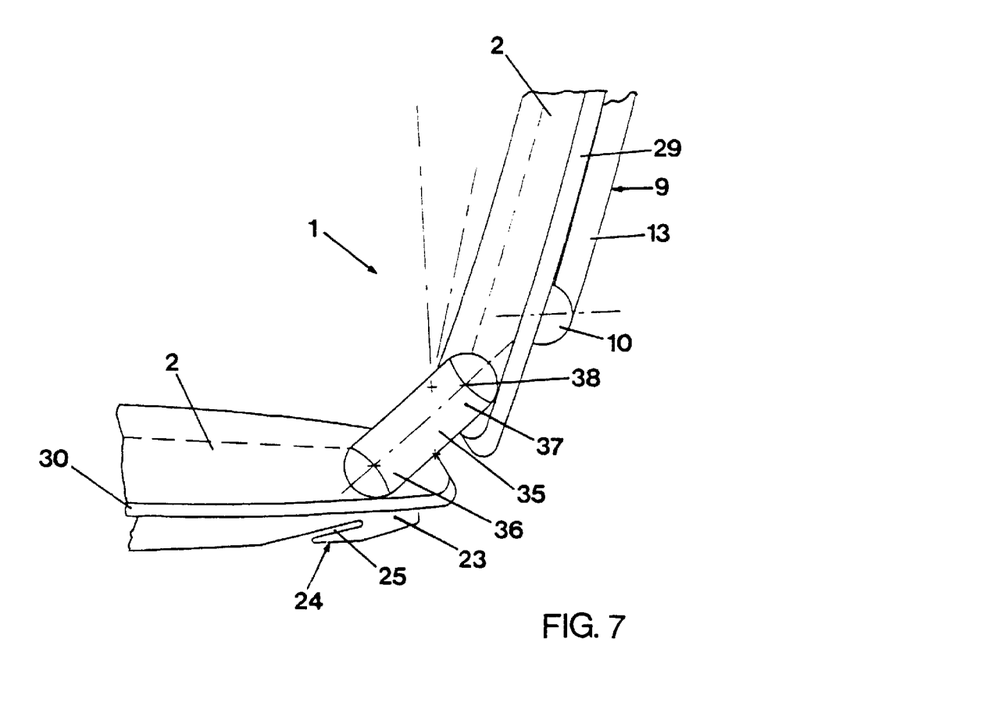
FIG. 7 is an enlarged partial side view of a second embodiment.

Whereas, in the embodiment of child's seat 1 according to FIGS. 1–4, seating surface part 2 and backrest part 3 are connected directly to each other at their transverse edges by way of hinge-like joint 4, in the embodiment shown in FIG. 7 this joint is realized by two connecting links 35. These two parts make it possible for the seat and the back to be collapsed into the flattest possible state so that the volume of the seat can be made as small as possible.

At their lower ends 36, these connecting links 35 are fixed immovably to seating surface part 7, whereas a pivot axis 38 extends along their upper ends 37, which can be realized in the form of, for example, pegs fitting in corresponding holes or as a rod, not shown in detail. In place of the two connecting links 35 according to FIG. 7, it is also possible to insert an intermediate part 39 between seating surface part 2 and backrest part 3, as shown in FIG. 8. Like connecting parts 35 of the embodiment according to FIG. 7, this part has the job of absorbing mechanical forces and, as described in connection with FIG. 7, also allows the seat and back shells to be folded together to form the flattest possible unit.

So that a child sitting on a child's seat such as that illustrated in the figures can be belted in, two safety belts 40 are provided, which, as shown in FIG. 8, are guided through appropriate openings in headrest 5 and fastened to reinforcing rail 31 at a centrally located point in the area of the seating surface part, that is, in the area of longitudinal axis 32, so that, in the area of seating surface part 2, they extend between the legs of the child sitting on child's seat 1.

Figure 9:
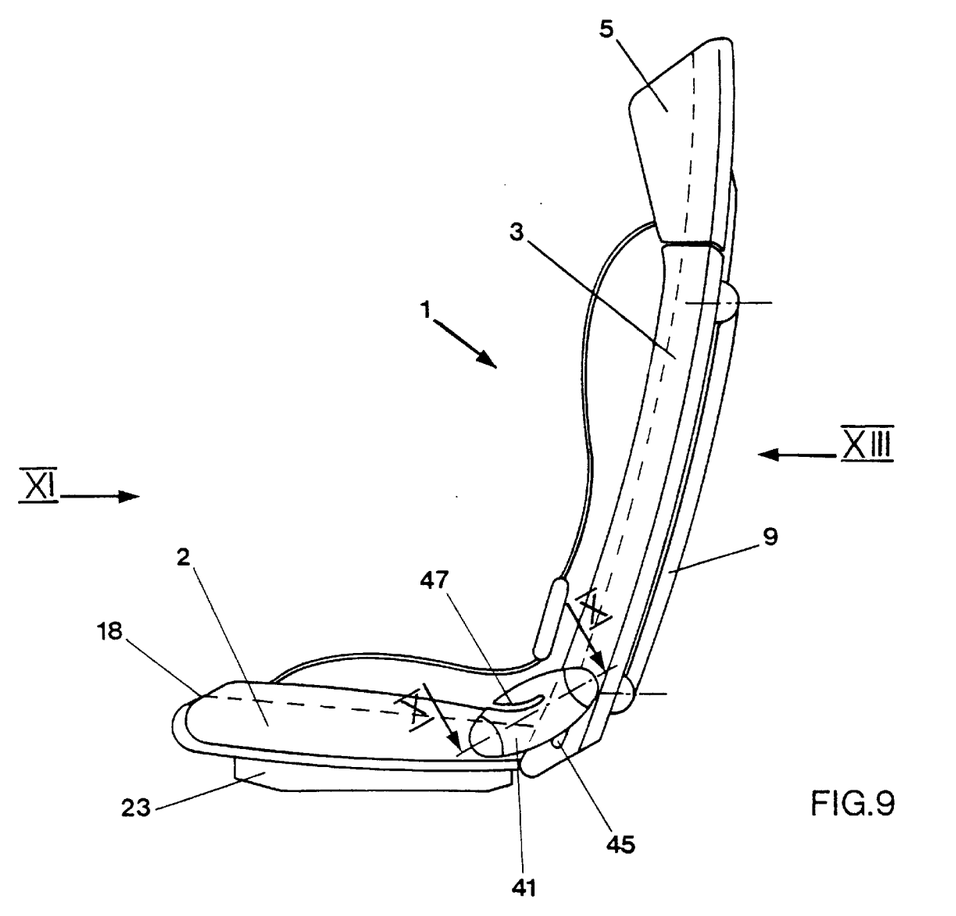
FIG. 9 is an additional side view of a child chair comparable with the structure of a child chair as represented in FIGS. 1 to 7, but with a modified connection between the seat and the back rest.
Figure 10:
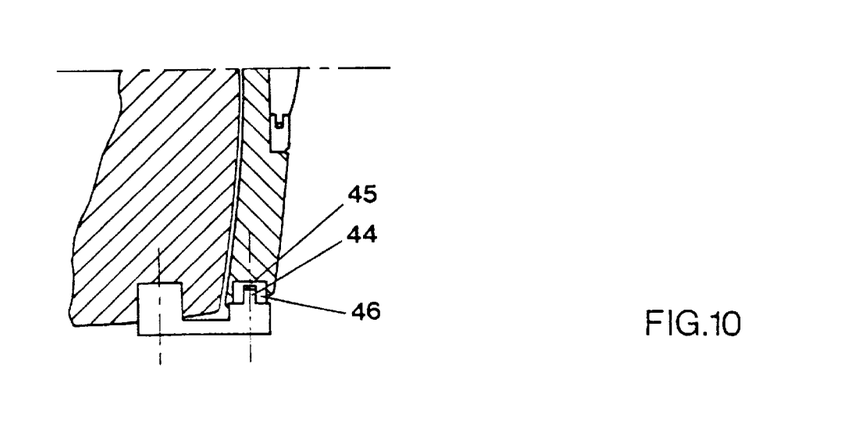
FIG. 10 is a section along line 10—10 in FIG. 9.
Figure 11:
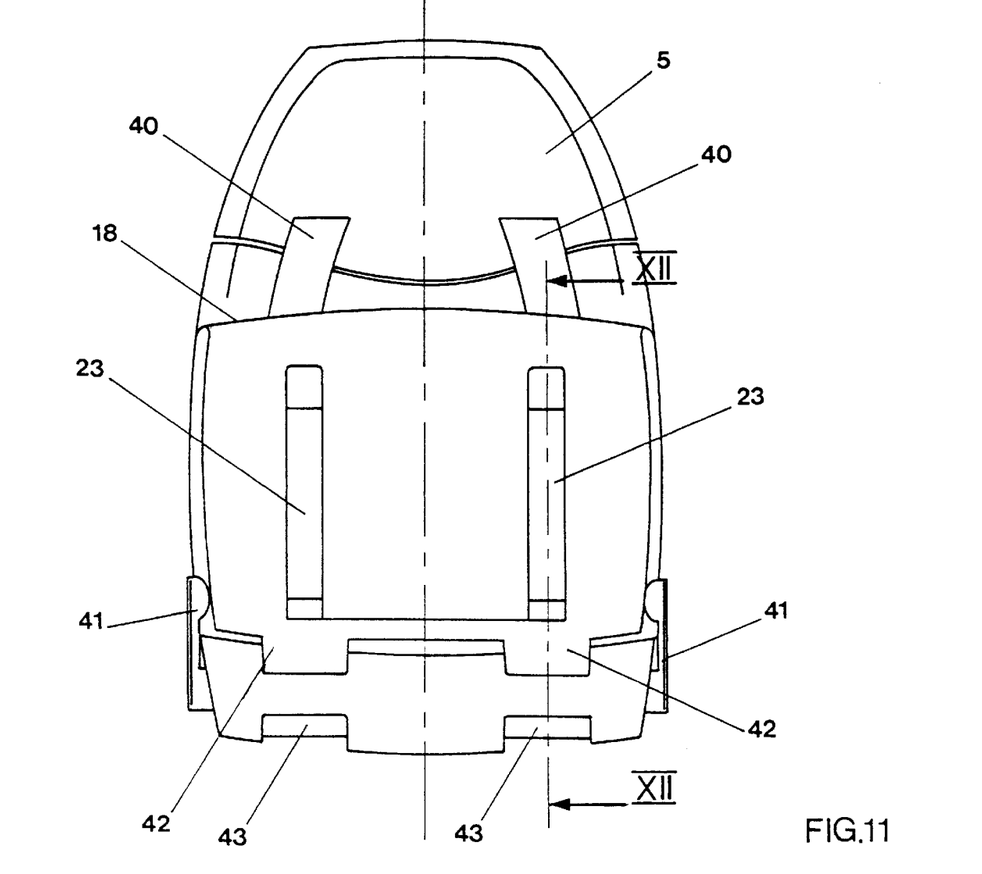
FIG. 11 is a view from the direction of the view arrow 11 in FIG. 9, but with the seat part folded up.
Figure 12:
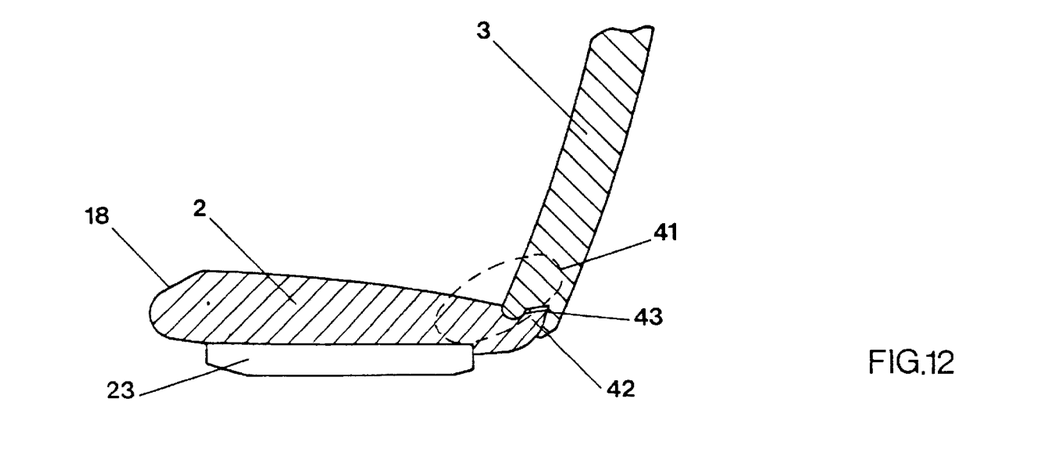
FIG. 12 is a section taken through the chair system of FIG. 11 along the section line 12—12 in FIG. 11, but with the seat in the unfolded position corresponding to the representation in FIG. 9.

The embodiment of the child chair, as represented in FIGS. 9 to 14, differs from the embodiments in FIGS. 1 to 7 in that, instead of the joint, i.e., the movement of the back rest 3 about the axis 38, which is formed by the bilateral junction (FIG. 7), the backrest 3 is held on the seat 2 in the deployed position represented in FIG. 9 by the fact that tenons 42 are provided on the back edge of the seat 2 and are inserted into grooves and recesses 43 in the back rest 3. The coupling 41, which is affixed to both sides of the seat 2, corresponding to the embodiment of FIGS. 1 to 7, serves in this case only to guide the seat 2 and the backrest 3 to the particular positions, for which purpose, as it can be seen with the aid of FIG. 10, a pin 44 is provided on the end of the coupling pointing toward the backrest 3 and is guided in a slot 45 of a guide 46. This arrangement with tenons 42 and grooves 43 on the backrest 3 and the seat 2 has the advantage that, in the seating position, both parts are held positively without the need for important mechanical parts. On the other hand, the two couplings 41 serve only to join the seat 2 and the backrest 3 together so that they form an inseparable unit in the folded position, as shown in FIG. 11.

In contrast to the previously described embodiments, in the case of the embodiment in FIGS. 9 to 14, in order to arrange the child seat 1 on the adult seat, the seat belt 22 of the latter is inserted into slots 47 which are formed in the two couplings 41. The slots 47 run from the front edge 18 of the seat 2, so that the seat belt (not shown in FIGS. 9 to 14) of an adult seat can be simply inserted and tightened in order to position the child seat firmly on such an adult seat. Inasmuch as the seat belt of the adult seat, which is inserted into the slot 47, does not form any uncomfortable pressure point for the child sitting in the child seat, the upholstery of the seat and back can be shaped accordingly in order to receive this seat belt in a recess.

Figure 13:
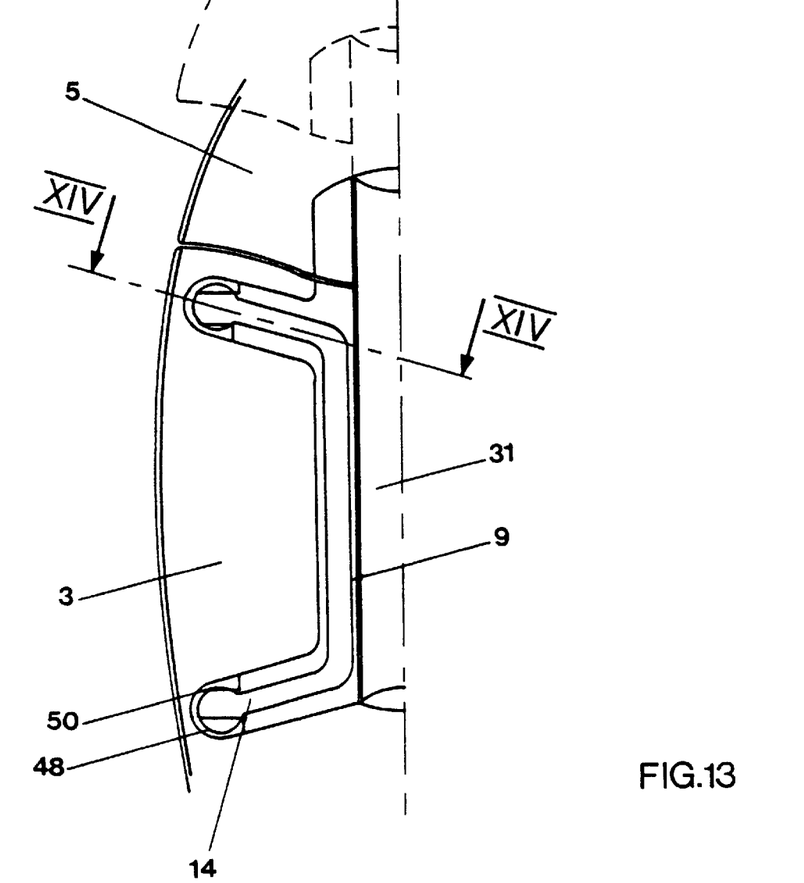
FIG. 13 is a view of the back rest from the direction of the view arrow 13 in FIG. 9, although only the left half of the back rest is represented in FIG. 13, with two different positions of the head rest.
Figure 14:
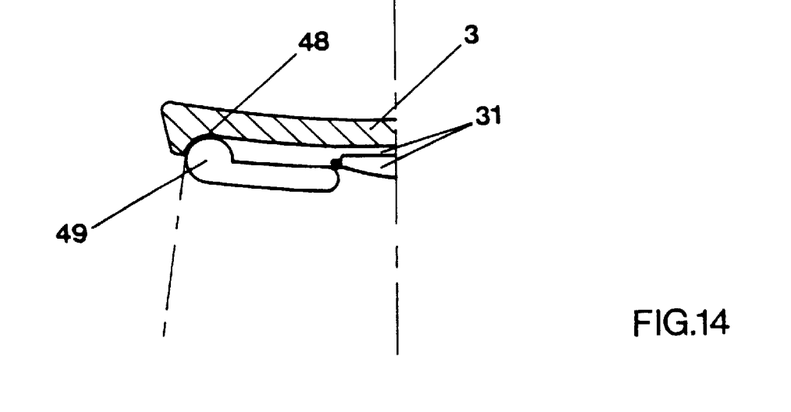
FIG. 14 is a section along section line 14—14 in FIG. 13.

The child seat of FIGS. 9 to 14 again has U-shaped bails 9 forming a spacing means for the purpose of spacing the child seat away from the backrest 7 of a main seat 6, as represented in FIGS. 1 and 3. These U-shaped bails 9 are shown, however, in FIGS. 9 to 14 in the folded position. Corresponding to the embodiment in FIG. 8, the ends of the free limbs 14 of the U-shaped bail 9 are in the form of balls which are inserted into corresponding sockets 48, which again are formed on a reinforcing rail 31. For assembly, the ball-shaped ends 49 can be fastened with a cover plate formed with a boss, as seen in FIG. 13. As can be seen in FIG. 13, the reinforcing rail 31 is of an H-shape in plan, so that the reinforcing rail 31 reaches toward the balls 49, so that the sockets 48 can be formed at these extremities. With such a structure, all forces which are produced at the U-shaped bails 9 are transferred to the reinforcing rail 31.

While U-shaped bails have been shown and described in the various embodiments, other spacing means such as inflatable cushions are also contemplated. Such cushions, in a first position, would be inflated, and in a second position, deflated.

It will be seen that individual parts and features which have been described on the basis of one of the various embodiments shown in the figures can be transferred to any of the other embodiments, even if these features have not been described specifically in conjunction with the other embodiment of the child's seat according to the invention.

I claim:

1. A child's seat for mounting on an adult seating unit of the type comprising a seat having a front edge, backrest, and seat belt means, said child's seat comprising:

a seating surface part having a top surface and a bottom surface which, in use, faces said seat;

a backrest part having a front surface and rear surface which, in use, faces said backrest of said adult seating unit;

connecting means connecting said backrest part to said seating surface part so that said backrest part is pivotable from a use position, wherein said front surface and said top surface are substantially perpendicular, to a collapsed position, wherein said front surface and said top surface are in mutually facing relationship; and spacing means fixed to said rear surface of said backrest part, said spacing means being movable from a first position, wherein said spacing means extends substantially flush with said rear surface;

said spacing means comprising two spacing members which are pivotably fixed to said rear surface;

each said spacing member being pivotable toward the other spacing member as said spacing means are moved from said first position to said second position;

each said spacing member being in the form of a bail having opposite ends which are pivotably fixed to said rear surface.

2. A child's seat as in claim 1, wherein said rear surface is provided with a recess for each said at least one spacing member, each said recess receiving said spacing member in said second position.

3. A child's seat as in claim 1 wherein said spacing members pivot about axes which are substantially vertical when said backrest is in said use position.

4. A child's seat as in claim 1 wherein said spacing members are each pivotable through an angle over 90° between said first position and said second position, whereby, in said first position, said members are splayed from each other and provide stability when said child's seat is mounted on said adult seating unit with said spacing members against said backrest.

5. A child's seat as in claim 1 further comprising retaining belt means fixed to said backrest part remote from said seating surface part, said retaining belt means being suitable for fixing said backrest part to said backrest of said adult seating unit when said spacing means is in said first position.

6. A child's seat at in claim 5 further comprising a pocket in said backrest part, said pocket receiving said retaining belt means when said backrest part is in said collapsed position.

7. A child's seat as in claim 1 wherein said seating surface part comprises hook means for receiving said seat belt means in order to fix said child's seat to said adult seating unit.

8. A child's seat as in claim 7 wherein said hook means comprises a pair of hook elements, each said hook element having therein a slit for receiving said seat belt means therethrough.

9. A child's seat as in claim 1 wherein said backrest part comprises a metal stiffening element running lengthwise away from the connecting means in a lengthwise direction which is vertical when said child's seat is fixed to said adult seating unit.

10. A child's seat as in claim 9 further comprising a headrest which is connected to said stiffening element so that said headrest can be moved in said lengthwise direction relative to said backrest part.

11. A child's seat as in claim 10 further comprising a pair of shoulder belts fixed to said backrest part and passing through slots in said headrest so that said belts can pass vertically over shoulders of a child sitting in the seat.

* * * * *